United States Patent
Messing et al.

(10) Patent No.: US 7,013,310 B2
(45) Date of Patent: Mar. 14, 2006

(54) METHOD AND APPARATUS FOR RETRIEVING AND PROCESSING DATA

(75) Inventors: Roy Messing, Ridgefield, CT (US); Jeremy N. Sokolic, New York, NY (US); Sanjeev Dheer, Scarsdale, NY (US); Venkatachari Dilip, Cupertino, CA (US)

(73) Assignee: CashEdge, Inc., New York, NY (US)

( * ) Notice: Subject to any disclaimer, the term of this patent is extended or adjusted under 35 U.S.C. 154(b) by 531 days.

(21) Appl. No.: 10/040,314

(22) Filed: Jan. 3, 2002

(65) Prior Publication Data

US 2003/0126134 A1 Jul. 3, 2003

(51) Int. Cl.
*G06F 17/00* (2006.01)

(52) U.S. Cl. ................ 707/104.1; 707/102; 707/101; 707/103 R (58) Field of Classification Search ............. 707/104.1, 707/102, 103 R, 3, 10; 709/225, 228, 230; 382/115; 379/67.1; 715/523
See application file for complete search history.

(56) References Cited

U.S. PATENT DOCUMENTS

| | | | | |
|---|---|---|---|---|
| 5,805,719 A | * | 9/1998 | Pare, Jr. et al. | 382/115 |
| 5,855,020 A | * | 12/1998 | Kirsch | 707/10 |
| 5,895,838 A | * | 4/1999 | Harjunmaa et al. | 73/864.13 |
| 6,038,603 A | * | 3/2000 | Joseph | 709/228 |
| 6,381,592 B1 | * | 4/2002 | Reuning | 707/3 |
| 6,609,128 B1 | * | 8/2003 | Underwood | 707/10 |
| 6,697,860 B1 | * | 2/2004 | Kung | 709/225 |
| 6,792,082 B1 | * | 9/2004 | Levine | 379/67.1 |

* cited by examiner

*Primary Examiner*—Alford Kindred
*Assistant Examiner*—Sana Al-Hashemi
(74) *Attorney, Agent, or Firm*—Lee & Hayes, PLLC (57) ABSTRACT

Data is captured from a web site or other data source. Data is extracted from the web page using a data harvesting script or other data acquisition routine. The extracted data is then normalized and stored in a database. If data cannot be extracted from the web page, a copy of the captured web page is stored without personal information contained in the web page. The data harvesting script is then edited based on an analysis of the captured web page.

29 Claims, 7 Drawing Sheets

METHOD AND APPARATUS FOR RETRIEVING AND PROCESSING DATA

TECHNICAL FIELD

The present invention relates to the retrieval and processing of data collected from web pages and/or other data sources.

BACKGROUND

Individuals, businesses, and other organizations typically maintain one or more financial accounts at one or more financial institutions. Financial institutions include, for example, banks, savings and loans, credit unions, mortgage companies, lending companies, and stock brokers. A customer's financial accounts may include asset accounts (such as savings accounts, checking accounts, certificates of deposit (CDs), mutual funds, bonds, and equities) and debt accounts (such as credit card accounts, mortgage accounts, home equity loans, overdraft protection, and other types of loans).

Many financial institutions allow customers to access information regarding their accounts via the Internet or other remote connection mechanism (often referred to as "online banking"). Typically, the customer navigates, using a web browser application, to a web site maintained by the financial institution. The web site allows the customer to login by entering a user identification and an associated password. If the financial institution accepts the user identification and password, the customer is permitted to access information (e.g., account holdings and account balances) regarding the financial accounts maintained at that financial institution.

Similarly, other organizations and institutions allow customer access to other types of accounts, such as email accounts, award (or reward) accounts, online bill payment accounts, etc. A user may navigate a web site or other information source to receive status information regarding one or more of their accounts.

Certain application programs are able to extract data from web pages based on a previously defined layout of information on the web pages. For example, an account balance may be positioned in a particular location of a specific web page. The application program extracts the account balance data from that particular location to obtain a customer's current account balance. However, if the layout of the web page is modified, the previously defined layout of information on the web page is not accurate and the application program cannot properly extract the desired data from the web page.

The systems and methods described herein addresses these and other problems by providing a mechanism for updating the manner in which data is extracted from web pages when a web page layout is changed.

SUMMARY

The systems and methods described herein automatically extract data from web pages and other data sources associated with various institutions. The data is extracted from a data source, such as a web page using a data harvesting script or other data extraction/data acquisition routine. The extracted data is stored in a database using a standard format. If the layout of data on a particular web page changes, a copy of the web page is captured and stored for future analysis when updating one or more data extraction procedures (e.g., data harvesting scripts). Personal or confidential information is deleted from the captured web page before storing the captured web page.

A particular embodiment captures a web page from an institution's web site. Data is extracted from the web page using a data harvesting script. The extracted data is then normalized and stored in a database.

In another embodiment, a web page is captured from a web site. An attempt is made to extract data from the web page using a data harvesting script. If data cannot be extracted from the web page, personal information is removed from the captured web page and the captured web page (without the personal information) is stored.

DETAILED DESCRIPTION

The system and methods described herein are capable of automatically extracting data from web pages or other data sources associated with one or more accounts or institutions, such as financial accounts or financial institutions. A particular web page or data source may contain account information associated with a customer of a particular institution. If an error occurs when attempting to extract data from a web page, a copy of the web page is saved for future analysis in determining the cause of the error and creating a new procedure for extracting data from the web page. When saving a copy of the web page for future analysis, confidential information is removed before storing the web page, thereby reducing the possibility of inadvertently exposing confidential information contained in the web page.

As used herein, the terms "account holder", "customer", "user", and "client" are interchangeable. "Account holder" refers to any person having access to an account. A particular account may have multiple account holders (e.g., a joint checking account having husband and wife as account holders or a corporate account identifying several corporate employees as account holders).

Various financial account and financial institution examples are provided herein for purposes of explanation. However, the methods and procedures described herein can be applied to any type of transaction involving any type of account. For example, a data aggregation system may aggregate data from multiple sources, such as multiple financial accounts, multiple email accounts, multiple online award (or reward) accounts, multiple news headlines, and the like. Similarly, the data retrieval and data processing systems and methods discussed herein may be applied to collect data from any type of account containing any type of data. Thus, the methods and systems described herein can be applied to a data aggregation system or any other account management system instead of the financial analysis system discussed in the examples provided herein.

Figure 1:
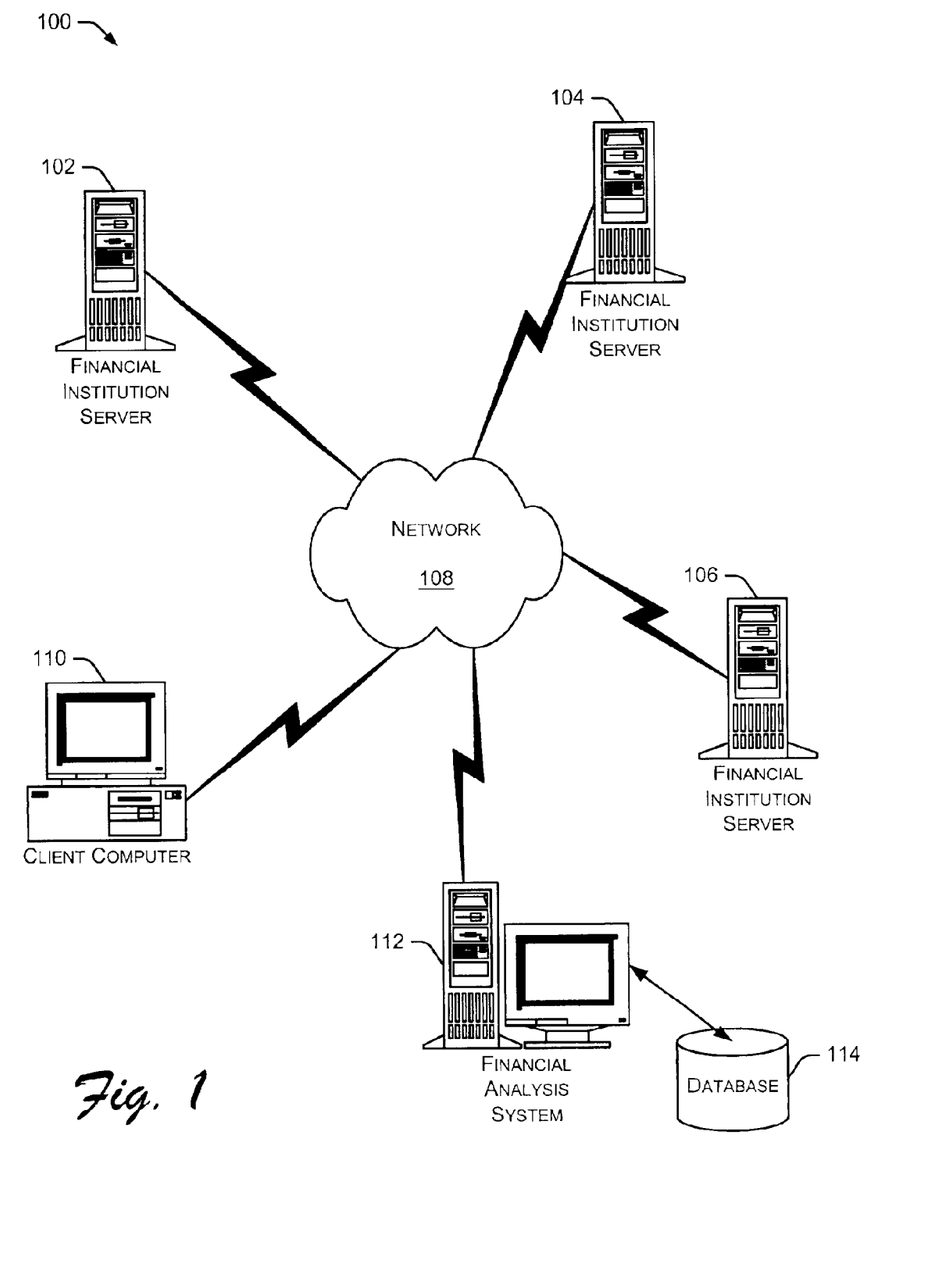
FIG. 1 illustrates an exemplary network environment in which various servers, computing devices, and a financial analysis system exchange data across a network, such as the Internet.

FIG. 1 illustrates an exemplary network environment 100 in which various servers, computing devices, and a financial analysis system exchange data across a network, such as the Internet. The network environment of FIG. 1 includes multiple financial institution servers 102, 104, and 106 coupled to a data communication network 108, such as the Internet. Data communication network 108 may be any type of data communication network using any network topology and any communication protocol. Further, network 108 may include one or more sub-networks (not shown) which are interconnected with one another.

A client computer 110 and a financial analysis system 112 are also coupled to network 108. Financial analysis system 112 includes a database 114 that stores various data collected and generated by the financial analysis system. Financial analysis system 112 performs various account analysis and data analysis functions, as discussed in greater detail below.

Client computer 110 and financial analysis system 112 may be any type of computing device, such as a desktop computer, a laptop computer, a palmtop computer, a personal digital assistant (PDA), a cellular phone, or a set top box. Client computer 110 communicates with one or more financial institution servers 102–106 to access, for example, information about the financial institution and various user accounts that have been established at the financial institution. Each of the financial institution servers 102–106 is typically associated with a particular financial institution and store data for that financial institution.

The communication links shown between network 108 and the various devices (102, 104, 106, 110, and 112) shown in FIG. 1 can use any type of communication medium and any communication protocol. For example, one or more of the communication links shown in FIG. 1 may be a wireless link (e.g., a radio frequency (RF) link or a microwave link) or a wired link accessed via a public telephone system or another communication network.

Figure 2:
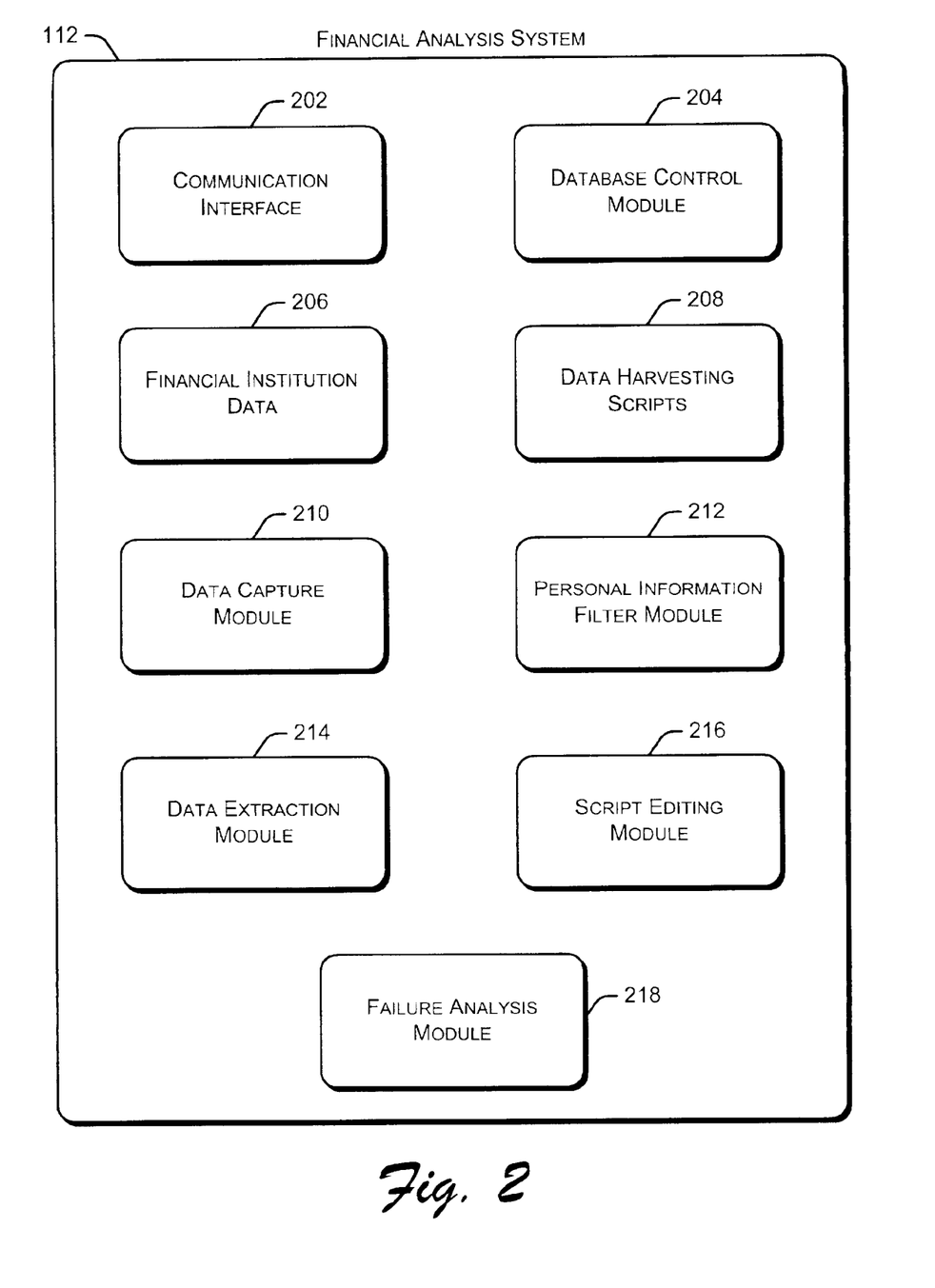
FIG. 2 is a block diagram showing exemplary components and modules of a financial analysis system.

FIG. 2 is a block diagram showing exemplary components and modules of financial analysis system 112. A communication interface 202 allows the financial analysis system 112 to communicate with other devices, such as one or more financial institution servers. In one embodiment, communication interface 202 is a network interface to a local area network (LAN), which is coupled to another data communication network, such as the Internet.

A database control module 204 allows financial analysis system 112 to store data to database 114 and retrieve data from the database. Financial analysis system 112 also stores various financial institution data 206, which may be used to locate and communicate with various financial institution servers. Financial institution data 206 includes, for example, account balance information, transaction descriptions, transaction amounts, and security holdings.

A variety of data harvesting scripts 208 are also maintained by financial analysis system 112. For example, a separate data harvesting script 208 may be maintained for each financial institution from which data is extracted. Data harvesting (also referred to as "screen scraping") is a process that allows, for example, an automated script to retrieve data from one or more web pages associated with a web site. Data harvesting may also include retrieving data from a data source using any data acquisition or data retrieval procedure. Additional details regarding data harvesting and data harvesting scripts are provided below.

Financial analysis system 112 includes a data capture module 210 and a data extraction module 214. The data capture module 210 captures data (such as web pages or OFX data) from one or more data sources. The data extraction module 214 retrieves (or extracts) data from the captured web pages or other data sources. The data extraction module 214 may use one or more data harvesting scripts 208 to retrieve data from a web page. A personal information filter module 212 removes confidential information from a web page. Thus, the majority of the content of the web page can be stored for future access without risking exposure of an account holder's confidential information.

Data capture module 210 may also retrieve data from sources other than web pages. For example, data capture module 210 can retrieve data from a source that supports the Open Financial Exchange (OFX) specification or the Quicken Interchange Format (QIF). OFX is a specification for the electronic exchange of financial data between financial institutions, businesses and consumers via the Internet. OFX supports a wide range of financial activities including consumer and business banking, consumer and business bill payment, bill presentment, and investment tracking, including stocks, bonds, mutual funds, and 401(k) account details. QIF is a specially formatted text file that allows a user to transfer Quicken transactions from one Quicken account register into another Quicken account register or to transfer Quicken transactions to or from another application that supports the QIF format.

A failure analysis module 218 in financial analysis system 212 analyzes the failure of a data harvesting script and determines why the script failed. For example, if a web page is redesigned by a financial institution, a data harvesting script that has not been updated to reflect the new web page design may not operate properly. In this situation, the information sought by the data harvesting script may have been moved to a different location on the new web page. The failure analysis module 218 assists a user in identifying the reason for the script failure. A script editing module 216 assists a user in editing a data harvesting script to function properly with a new web page design.

Figure 3A:
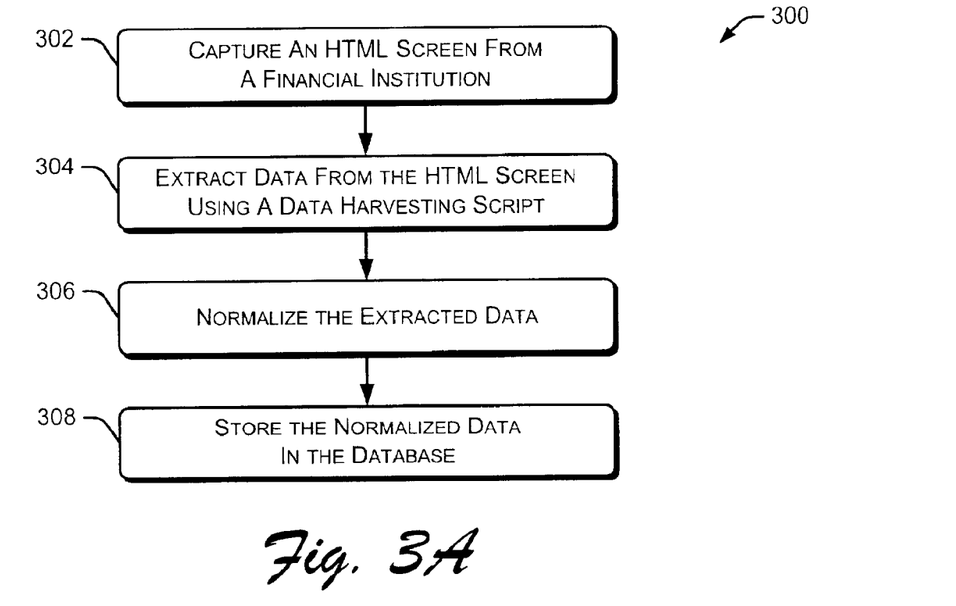
FIGS. 3A and 3B are flow diagrams illustrating procedures for retrieving data from an HTML screen and another data source.
Figure 3B:
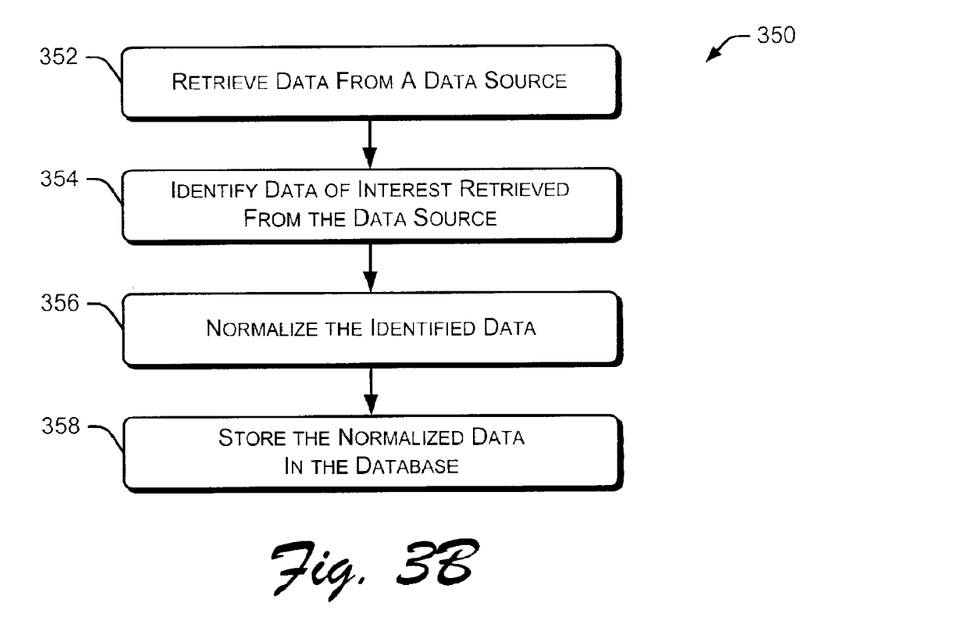

FIGS. 3A and 3B are flow diagrams illustrating procedures for retrieving data from an HTML screen and another data source. Specifically, FIG. 3A is a flow diagram illustrating a procedure 300 for retrieving data from an HTML screen. Initially, the procedure 300 captures an HTML (HyperText Markup Language) screen from a financial institution web site (block 302). For example, the HTML screen may be a web page associated with the financial institution. Data is then extracted from the HTML screen using a data harvesting script (block 304). The extracted data is then normalized (block 306), which refers to the process of arranging the extracted data into a standard format such that data collected from a variety of different web pages is arranged (or normalized) into the same format. The normalized data is then stored in the database (e.g., database 114 in FIG. 1) for future reference (block 308).

The normalizing of data is useful when collecting data from multiple sources (e.g., multiple financial institutions). Each financial institution may use different terms for the same type of data. For example, one financial institution may use the term "buy" while another financial institution uses the term "purchase" for the same type of transaction. By normalizing the data, a single database can be used to store financial information related to multiple different financial institutions. Thus, various financial analysis tools and procedures can be used to analyze data across multiple financial institutions or other data sources.

As mentioned above, data harvesting (or screen scraping) is a process that allows an automated script to retrieve data from a web site and store the retrieved data in a database. The data harvesting scripts are capable of navigating web sites and capturing individual HTML pages. For example, JavaScript and images may be removed from the HTML pages or converted into HTML text if it contains account information. A parser then converts the HTML data into a field-delimited XML format. The XML data communicates with enterprise java beans (EJBs) through an XML converter. EJBs perform a series of SQL queries that populate the data into the database. The success of a particular data harvesting process is related to the layout of the web site being harvested in two important ways: 1) the data harvesting script must navigate to the correct HTML page, and 2) the parser must know which cells in the HTML tables contain specific data items.

FIG. 3B is a flow diagram illustrating a procedure 350 for retrieving and processing data from a data source (other than an HTML screen). The data source may be, for example, a financial institution or other provider of financial data. The data source may also be referred to as a "file download source" or a "data download source". The data source may communicate data using the OFX standard, the QIF format, or some other data format. The procedure 350 begins by retrieving data from a data source (block 352). The procedure identifies data of interest from the retrieved data (block 354). The data of interest may be, for example, data associated with a particular customer's accounts. The identified data is then normalized (block 356) and stored in the database (block 358). The database may contain data related to other customers and/or data collected from other sources (such as HTML screens).

Figure 4:
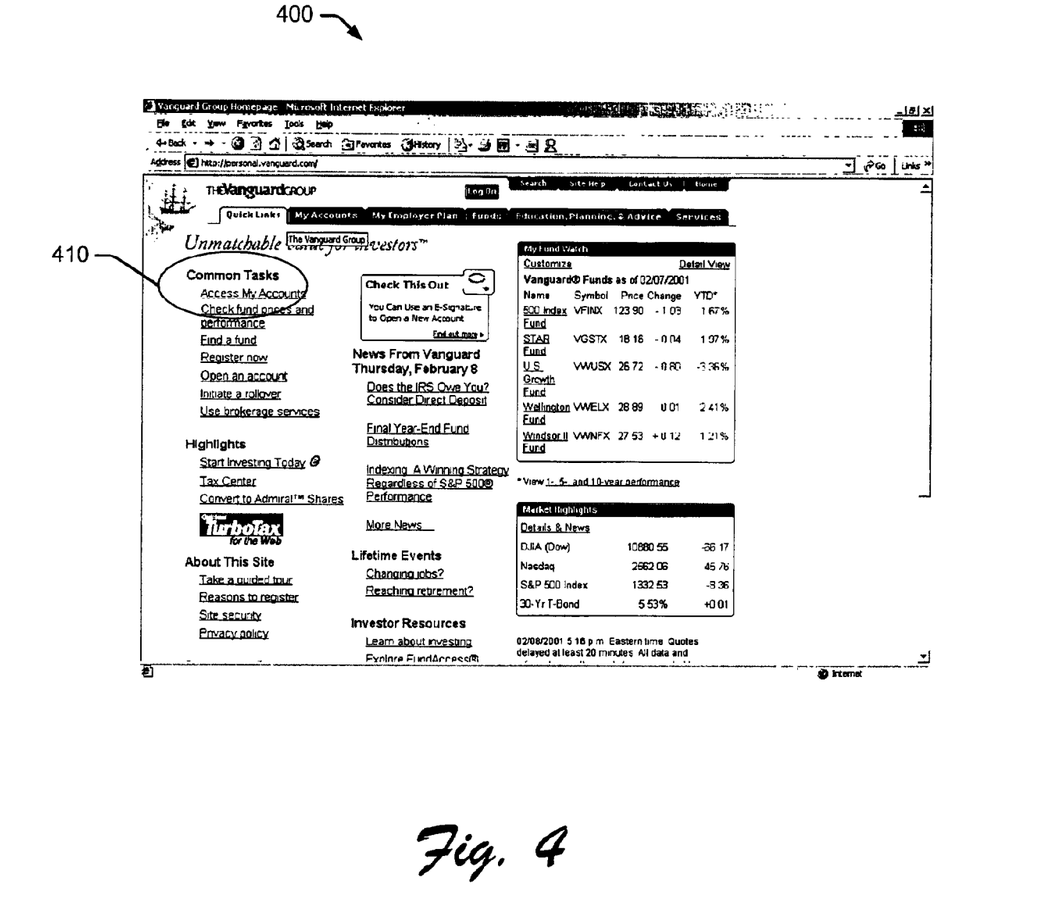
FIGS. 4 and 5 illustrate exemplary web pages associated with a particular financial institution.
Figure 5:
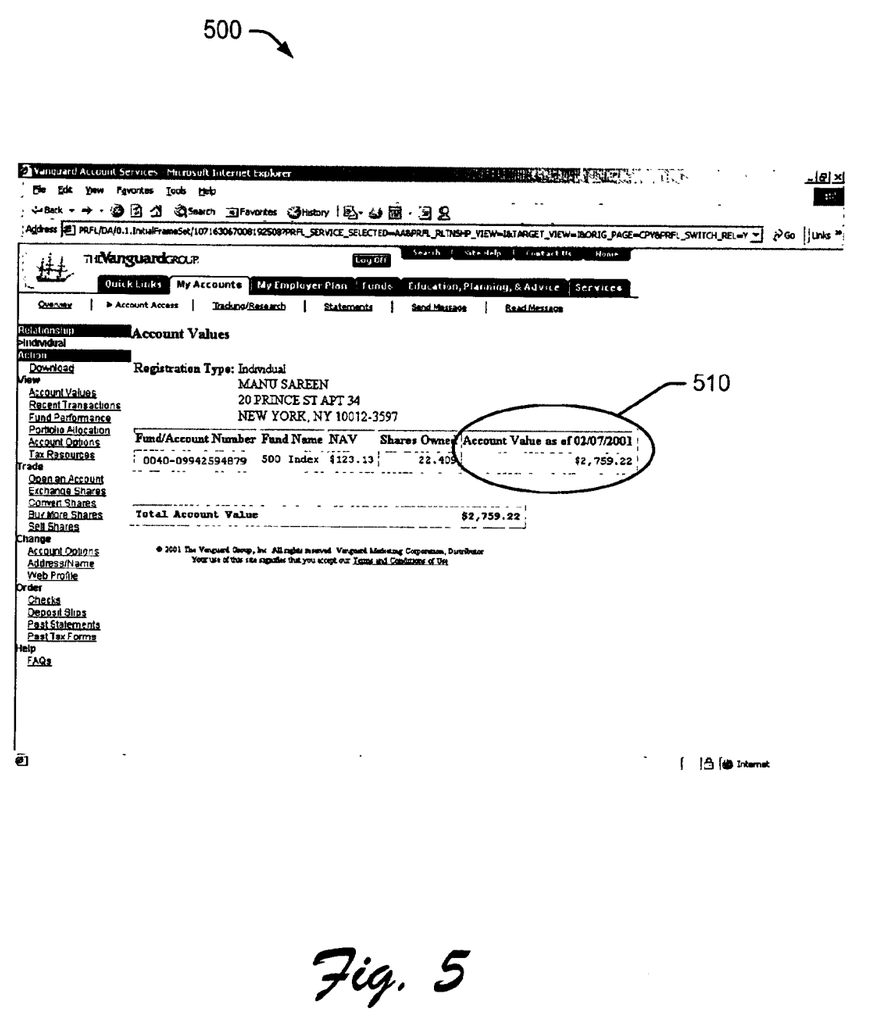

FIGS. 4 and 5 illustrate exemplary web pages 400 and 500, respectively, associated with a particular financial institution. A particular data harvesting script may look for specific text on the web page to confirm that the script has navigated to the correct site. For example, to ensure that the Vanguard screen scraping script has navigated to the "Quick Links" web page, the script looks for the phrase "Common Tasks" in row 1 of table 1 (see the portion of the web page surrounded by a ring 410). If this phrase is found, the script can then navigate to row two and select the "Access my Accounts" link that takes the script to a secure login page (e.g., an HTTPS login page). If the script cannot locate the phrase "Common Tasks" it will generate an exception error and stop running.

Once the script has found the correct page, pattern matches are used by the parser to determine the appropriate cell from which to retrieve specific data items. For example, once the data harvesting script has navigated to the "Account Values" page (shown in FIG. 5), the script identifies the correct row from which to retrieve data by pattern matching a combination of the fund/account number and the fund name in columns one and two. The script also matches the column header name and then moves down the column to the appropriate row in the column. In this example, the parser will populate the data field "Account Value" with the data in the cell in row one and column five. This account value information is highlighted by a ring 510 in FIG. 5.

Figure 6:
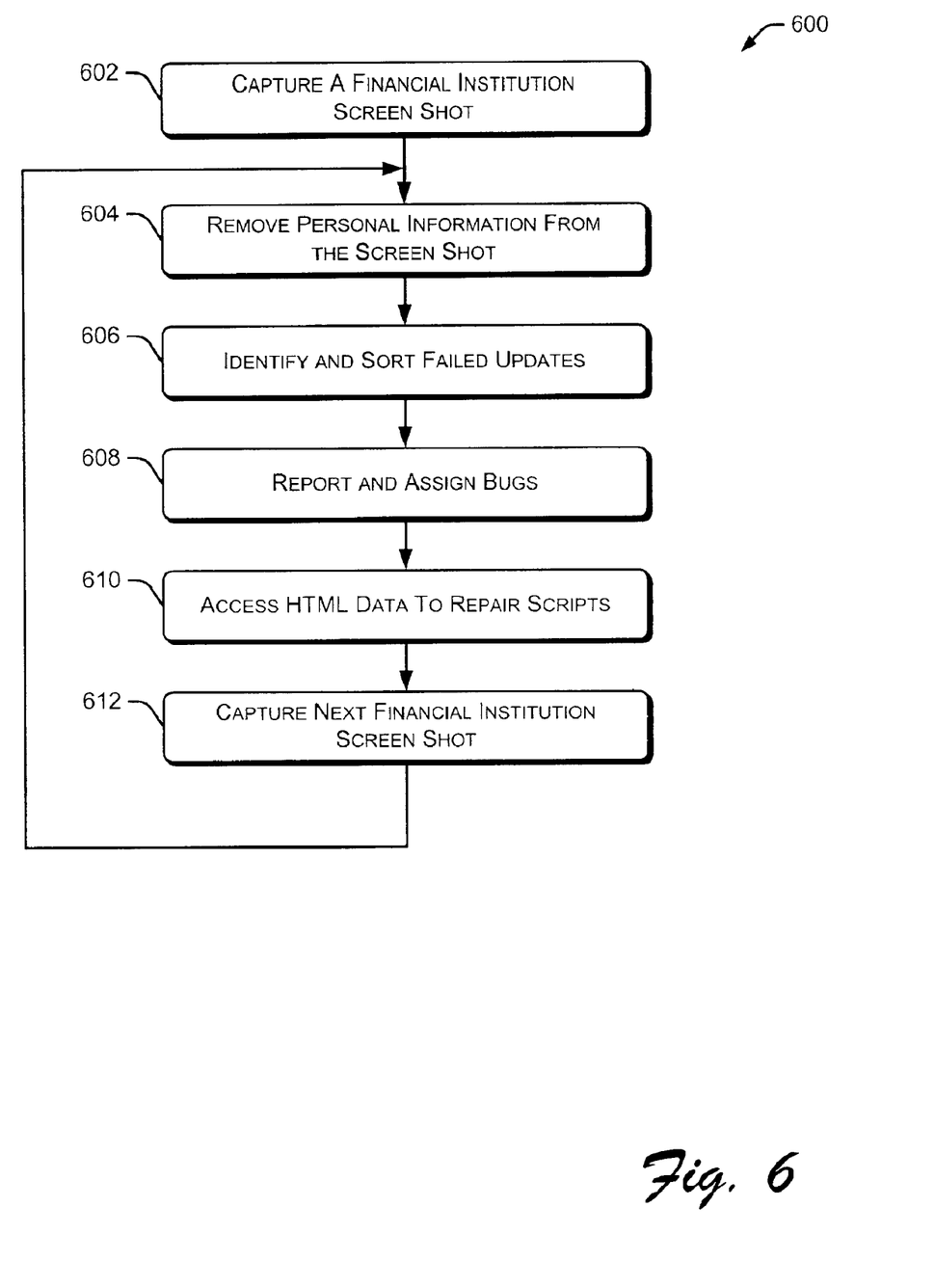
FIG. 6 is a flow diagram illustrating a procedure for retrieving financial data and adjusting a data harvesting script if the financial data layout has changed.

FIG. 6 is a flow diagram illustrating a procedure 600 for retrieving financial data and adjusting a data harvesting script if the financial data layout has changed. Initially, the procedure 600 captures a financial institution screen shot (block 602). For example, a screen shot associated with a particular financial institution web page or web site. Next, the procedure removes personal and/or confidential information from the screen shot (block 604). Example personal and/or confidential information that is removed includes customer name, address, telephone number, email address, and social security number.

The procedure 600 then identifies and sorts all failed updates (block 606). A failed update may occur when a data harvesting script attempts to update a user's account information but the layout of the financial institution's web pages have changed. The procedure may search the database for all failed updates by error code (error codes are discussed in greater detail below). The results of the search are provided to one or more individuals responsible for updating screen scraping scripts. Next, bugs are reported and assigned to a particular individual or group for processing (block 608).

At block 610, a user accesses the HTML data (i.e., the screen shot captured from the financial institution) to repair the scripts that are not functioning properly. The procedure then continues to block 612, which captures the next financial institution screen shot. The procedure returns to block 604 to remove personal information from the captured screen shot.

When a data harvesting script is unable to access a particular web page (or web site) or is unable to locate information on the web page an error occurs. The data harvesting script contains error detection mechanisms that identify errors and generate one or more error codes associated with the identified errors. Each error has an associated error code that identifies the particular error. Table 1 below identifies several example error codes as well as a corresponding title and description of the error that occurred.

TABLE 1

| Error Code | Title | Description |
| --- | --- | --- |
| 100 | Web Page Modified | Unable to retrieve account information from financial institution web page due to changes in web page. |
| 101 | Time Out | Unable to retrieve account information due to high network traffic. |
| 102 | Connection Failed | Unable to retrieve account information due to network connection problems. |
| 103 | Web Site Unavailable | Unable to retrieve account information because the financial institution web site is not available. |
| 104 | Login Failure | Unable to retrieve account information because the username/password combination provided by user failed. |

Different actions may be performed depending on the error detected. For example, if the web page has been modified, the screen shot of the modified web page is provided to one or more individuals to analyze and update the corresponding data harvesting script to properly extract data from the modified web page. If the error indicates a failed network connection, the financial analysis system may attempt to retrieve the desired web pages at a later time. If the error indicates that the username and/or password provided by the user is incorrect, the financial analysis system may request the user verify the username and password associated with the account being accessed.

The error codes may be processed by an automated error handling routine to notify the proper individual, or group of individuals, of the error. For example, a database error may be automatically routed to a group of individuals responsible for managing the database. Other error codes may indicate a problem with the information provided by the user. These error codes, such as an invalid password to access a user account, result in sending an error notice to the user, but do not represent a problem with the financial analysis system.

Figure 7:
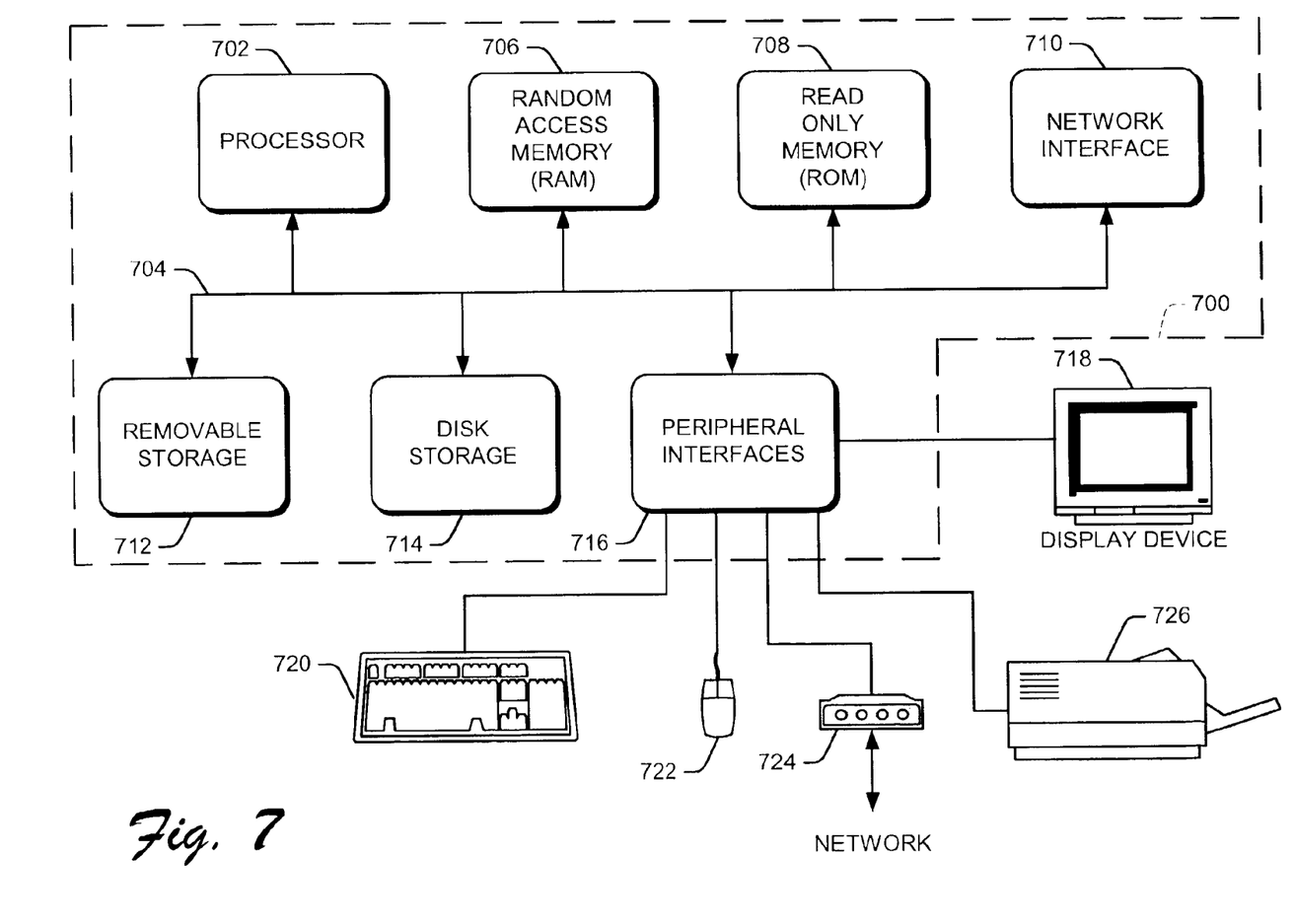
FIG. 7 is a block diagram showing pertinent components of a computer in accordance with the invention.

FIG. 7 is a block diagram showing pertinent components of a computer 700 in accordance with the invention. A computer such as that shown in FIG. 7 can be used, for example, to perform various procedures such as those discussed herein. Computer 700 can also be used to access a web site or other computing facility to access various financial information. The computer shown in FIG. 7 can function as a server, a client computer, or a financial analysis system, of the types discussed herein.

Computer 700 includes at least one processor 702 coupled to a bus 704 that couples together various system components. Bus 704 represents one or more of any of several types of bus structures, such as a memory bus or memory controller, a peripheral bus, and a processor or local bus using any of a variety of bus architectures. A random access memory (RAM) 706 and a read only memory (ROM) 708 are coupled to bus 704. Additionally, a network interface 710 and a removable storage device 712, such as a floppy disk or a CD-ROM, are coupled to bus 704. Network interface 710 provides an interface to a data communication network such as a local area network (LAN) or a wide area network (WAN) for exchanging data with other computers and devices. A disk storage 714, such as a hard disk, is coupled to bus 704 and provides for the non-volatile storage of data (e.g., computer-readable instructions, data structures, program modules and other data used by computer 700). Although computer 700 illustrates a removable storage 712 and a disk storage 714, it will be appreciated that other types of computer-readable media which can store data that is accessible by a computer, such as magnetic cassettes, flash memory cards, digital video disks, and the like, may also be used in the exemplary computer.

Various peripheral interfaces 716 are coupled to bus 704 and provide an interface between the computer 700 and the individual peripheral devices. Exemplary peripheral devices include a display device 718, a keyboard 720, a mouse 722, a modem 724, and a printer 726. Modem 724 can be used to access other computer systems and devices directly or by connecting to a data communication network such as the Internet.

A variety of program modules can be stored on the disk storage 714, removable storage 712, RAM 706, or ROM 708, including an operating system, one or more application programs, and other program modules and program data. A user can enter commands and other information into computer 700 using the keyboard 720, mouse 722, or other input devices (not shown). Other input devices may include a microphone, joystick, game pad, scanner, satellite dish, or the like.

Computer 700 may operate in a network environment using logical connections to other remote computers. The remote computers may be personal computers, servers, routers, or peer devices. In a networked environment, some or all of the program modules executed by computer 700 may be retrieved from another computing device coupled to the network.

Typically, the computer 700 is programmed using instructions stored at different times in the various computer-readable media of the computer. Programs and operating systems are often distributed, for example, on floppy disks or CD-ROMs. The programs are installed from the distribution media into a storage device within the computer 700. When a program is executed, the program is at least partially loaded into the computer's primary electronic memory. As described herein, the invention includes these and other types of computer-readable media when the media contains instructions or programs for implementing the steps described below in conjunction with a processor. The invention also includes the computer itself when programmed according to the procedures and techniques described herein.

For purposes of illustration, programs and other executable program components are illustrated herein as discrete blocks, although it is understood that such programs and components reside at various times in different storage components of the computer, and are executed by the computer's processor. Alternatively, the systems and procedures described herein can be implemented in hardware or a combination of hardware, software, and/or firmware. For example, one or more application specific integrated circuits (ASICs) can be programmed to carry out the systems and procedures described herein.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method comprising:

capturing a web page from a web site; comprising:

extracting data from the web page using a data harvesting script;

normalizing the extracted data with data extracted from other web pages;

generating a context-specific error code if the data harvesting script fails to successfully extract data from the web page;

adapting the data harvesting script based on identified changes to the web page; and storing the normalized data in a database.

2. A method as recited in claim 1 wherein the web site is associated with a financial institution.

3. A method as recited in claim 2 wherein the captured web page contains information regarding a customer's account at the financial institution.

4. A method as recited in claim 1 wherein the web page is an HTML screen.

5. A method as recited in claim 1 further comprising:

capturing a second web page from a second web site;

extracting data from the second web page using the data harvesting script;

normalizing the data extracted from the second web page with data extracted from other web pages;

generating a context-specific error code if the data harvesting script fails to sucessfully extract data from the second web page;

adapting the data harvesting script based on identified changes to the web page; and storing the normalized data from the second web page in the database.

6. A method as recited in claim 1 wherein the context-specific error code identifies a type of change necessary to the data harvesting script to properly extract data from the web page.

7. A method as recited in claim 1 further comprising storing a copy of the captured web page if data cannot be extracted from the web page using the data harvesting script.

8. One or more computer-readable memories containing a computer program that is executable by a processor to perform the method recited in claim 1.

9. A method comprising:

retrieving financial data associated with a user's financial account from a data source;

identifying data of interest retrieved from the data source;

generating a context-sensitive error code if the data of interest is not successflly retrieved from the data source, wherein the context-sensitive error code is used to modify the manner in which data is retrieved from the data source;

normalizing the identified data; and storing the normalized data in a database.

10. A method as recited in claim 9 further comprising:

retrieving financial data associated with a user from a second data source;

normalizing the data retrieved from the second data source; and storing the normalized data in the database.

11. One or more computer-readable memories containing a computer program that is executable by a processor to perform the method recited in claim 9.

12. A method comprising:

capturing a web page from a web site;

attempting to extract data from the web page using a data harvesting script;

if data cannot be extracted from the web page;

removing pre-determined personal information from the captured web page;

storing the captured web page without the personal information;

analyzing the web page and the data harvesting script to determine why data could not be extracted from the web page; and adapting the data harvesting script based on the determination why data could not be extracted from the web page.

13. A method as recited in claim 12 further comprising editing the data harvesting script based on an analysis of the captured web page, wherein the edited data harvesting script successfully extracts data from the web page.

14. A method as recited in claim 12 further comprising:

editing the data harvesting script based on an analysis of the captured web page;

capturing a new version of the web page from the web site; and extracting data from the web page using the edited data harvesting script.

15. A method as recited in claim 14 further comprising:

normalizing the data extracted from the web page; and storing the normalized data in a database.

16. One or more computer-readable memories containing a computer program that is executable by a processor to perform the method recited in claim 12.

17. A method comprising:

capturing a first web page from a first financial institution web site;

capturing a second web page from a second financial institution web site;

extracting data from the first web page using a first data harvesting script;

extracting data from the second web page using a second data harvesting script;

normalizing the data extracted from the first web page and the second web page;

generating a context-specific error code if the first data harvesting script fails to successfully extract data from the first web page; and storing the normalized data in a database.

18. A method as recited in claim 17 further comprising generating an error message if data cannot be extracted from the first web page or the second web page.

19. One or more computer-readable memories containing a computer program that is executable by a processor to perform the method recited in claim 17.

20. A method as recited in claim 17 wherein capturing a first web page includes capturing a first set of web pages.

21. A method as recited in claim 17 wherein capturing a second web page includes capturing a second set of web pages.

22. An apparatus comprising:

a data capture module configured to capture a first web page from a first web site associated with a first financial institution and further configured to capture a second web page from a second web site associated with a second financial institution;

a personal information filter module coupled to the data capture module configured to remove personal information from one or more web pages, wherein the personal information filter module generates a specific error code if the personal information filter module is not able to identify personal information on a particular web page;

a data extraction module coupled to the data capture module and configured to extract data from the first and second web pages using a data harvesting script, the data extraction module further configured to normalize the data extracted from the first and second web pages, and wherein the data extraction module is adaptable based on changes to web pages that occur over time; and a database control module coupled to the data extraction module and configured to store the normalized data in a common database.

23. An apparatus as recited in claim 22 wherein the data capture module is further configured to retrieve financial data associated with a user's account from a data source.

24. An apparatus as recited in claim 22 wherein the data extraction module is further configured to generate an error message if data cannot be extracted from the web page using the data harvesting script.

25. One or more computer readable media having stored thereon a plurality of instructions that, when executed by one or more processors, cause the one or more processors to:

capture a web page from a financial institution web site;

attempt to extract data from the captured web page using a data harvesting script;

remove personal information from the captured web page;

store the captured web page without the personal information; and if data cannot be extracted from the web page, generate a context-specific error code and analyze the web page to determine why data could not be extracted from the web page.

26. One or more computer readable media as recited in claim 25, wherein if data cannot be extracted from the web page, the one or more processors further edit the data harvesting script based on an analysis of the captured web page and the context-specific error code.

27. One or more computer readable media as recited in claim 25, wherein the one or more processors further:

normalize the data extracted from the web page; and store the normalized data in a database, wherein the database contains data extracted from other web pages.

28. A method as recited in claim 12 wherein the personal information includes at least one of: a social security number, an account number, or an account holder's name.

29. A method as recited in claim 22 wherein the personal information includes at least one of: a social security number, an account number, or an account holder's name.

* * * * *